United States Patent
Babst et al.

(10) Patent No.: US 6,429,420 B1
(45) Date of Patent: Aug. 6, 2002

(54) REVERSING AID

(75) Inventors: Ulrich Babst; Michael Hofmann, both of München; Peter Nave, Hohenbrunn, all of (DE)

(73) Assignee: DaimlerChrysler AG, Stuttgart (DE)

( * ) Notice: Subject to any disclaimer, the term of this patent is extended or adjusted under 35 U.S.C. 154(b) by 34 days.

(21) Appl. No.: 09/607,476

(22) Filed: Jun. 30, 2000

(30) Foreign Application Priority Data

Jul. 14, 1999 (DE) .......................... 199 32 779

(51) Int. Cl.[7] .............................. G09G 5/00
(52) U.S. Cl. ................. 250/221; 180/232; 280/335
(58) Field of Search ................ 250/221, 206.1, 250/206.2, 234, 235; 180/232, 274; 280/335, 761, 762; 340/932.2

(56) References Cited

U.S. PATENT DOCUMENTS

| 5,373,482 A | * 12/1994 | Gauthier ................ 367/99 |
| 5,808,728 A | 9/1998 | Uehara |
| 5,999,092 A | * 12/1999 | Smith et al. ............. 340/436 |
| 6,208,267 B1 | * 3/2001 | Hoenninger et al. ...... 340/93.2 |

FOREIGN PATENT DOCUMENTS

| DE | G 87 17 494.4 | | 3/1989 | |
| DE | 4201806 | * | 9/1992 | .......... G01S/13/93 |
| DE | 4201806 A1 | * | 9/1992 | .......... B60T/007/22 |
| DE | 43 03 066 C2 | | 8/1994 | |
| GB | 2246331 A | * | 1/1992 | .......... B62D/15/02 |
| GB | 2351055 | * | 12/2000 | .......... B60R/1/00 |
| JP | 05296777 | | 11/1993 | |
| JP | 08122060 | | 5/1996 | |
| JP | 08210821 | | 8/1996 | |

* cited by examiner

*Primary Examiner*—Robert H. Kim
*Assistant Examiner*—Irakli Kiknadze (57) ABSTRACT

The invention relates to a reversing aid for supporting the driver of a motor vehicle, particularly when parking, comprising at least one transmitter (12), arranged at the rear end region (10) of the motor vehicle, for emitting measuring beams (14) into the rear danger zone, at least one receiver (16, 16a, 16b), arranged at the rear end region (10) of the motor vehicle, for receiving beams (20) reflected at at least one detected object (18), a distance-measuring device for determining the distance (A) between the vehicle and the detected object (18), and a display device (22) for optically representing the distance (A) from the detected object (18). Furthermore, the reversing aid comprises a measuring beam horizontal guidance system for the purpose of periodically scanning a predetermined angle range in the horizontal plane, an evaluation device for determining the position of the detected object in the horizontal plane relative to the vehicle rear end and to the extent of the width of the detected object, and a display screen (24) for pictorially representing the position and the extent of the width of the detected object in the horizontal plane relative to the vehicle rear end (10).

10 Claims, 6 Drawing Sheets

REVERSING AID

BACKGROUND OF THE INVENTION

The invention relates to an aid for assisting the driver of a motor vehicle, particularly when driving a vehicle in reverse gear.

When driving a vehicle in reverse gear it may be difficult to see into the space immediately behind the rear of the vehicle. For example, because of steep bodylines on some vehicles it is difficult to detect the end of the vehicle. This is also the case with closed delivery vans or trucks with closed superstructures.

When driving a vehicle in reverse a driver may not be able to detect an obstacle in the path of the vehicle.

For this purpose, aids are known which permit obstacles in the zone behind a reversing motor vehicle to be detected, and corresponding signals to be output to the vehicle driver.

Utility Model DE 87 17 494 U1 describes a parking aid. Arranged on the rear side of a motor vehicle are a transmitter, which emits an infrared beam or laser beam, and a receiver, which receives the measuring beam reflected by an object. The measured distance from the object is displayed to the driver by means of an LED display chain via an electronic evaluation system.

It is certainly possible with this parking aid to determine the distance between the transmitter/receiver and the detected object. However, the driver may still be unable to gain a complete picture of the actual path of the vehicle and of any objects located therein. Because of a lack of sufficient information, the driver may execute a driving manoeuvre which causes an undetected object to be driven into. Thus, in particular, the rear corner regions are particularly of interest when the vehicle is at an oblique angle to the detected object, but a simple distance measurement determines only distance from the middle of the rear end.

DE 43 03 066 C2 describes a further parking aid. In order to facilitate parking, in particular of large vehicles, a distance-warning device with an optical sensor system is provided in this case. The sensor system is intended to detect an obstacle in the form of an object or a vehicle part while taking account of a minimum distance. The radiation transmitter and radiation receiver used are aligned obliquely downwards, the radiation lobes, which are correspondingly directed obliquely downwards, marking the range of the minimum distance. A range measurement is carried out when an obstacle penetrates the radiation lobe. The pulsed radiation components reflected at the object are detected by the respective radiation transmitter and fed to corresponding signal conditioning and signal processing.

A simple distance measurement is also carried out in the case of this parking aid. The driver is warned when he drives up too close to a detected object, but, once again, cannot gain a picture of the rear danger zone.

The known aids have in common the disadvantage that a plurality of obstacles, which are in different positions and/or of different height, in the rear danger zone cannot be detected with adequate reliability when the relevant object is not completely detected by the static measuring beams. With the aid of the known parking aids, the driver is not able to establish where the vehicle rear end is located relative to the objects located in the rear danger zone. Given this knowledge the driver would be able to decide on a specific steering movement and/or a specific driving direction in order to drive around the object determined and/or to avoid a collision with it.

The object of the invention is to specify a reversing aid which, in particular in the case of reversing, supplies the driver with reliable information on the respective spatial arrangement of objects located in the rear danger zone relative to the vehicle. Moreover, the reversing aid according to the invention is intended to make it possible to implement the detection of objects and processing of information in a way which is particularly simple, robust, reliable and cost-effective.

This object is achieved according to the invention by means of a reversing aid having the features of the claims. The subclaims advantageously relate to developments of the reversing aid according to the invention.

In the case of the reversing aid according to the invention, there are arranged at the rear end region of the motor vehicle at least one transmitter for emitting measuring beams into the rear danger zone, and at least one receiver for receiving beams reflected at at least one detected object. A distance-measuring device determines the distance between the vehicle and the detected object, which is represented optically with the aid of a display device.

In accordance with a basic idea of the invention, the reversing aid has a measuring beam horizontal guidance system for the purpose of periodically scanning a predetermined angle range in the horizontal plane. In this case, an evaluation device determines the position of the detected object in the horizontal plane relative to the vehicle rear end, and the extent of the width, or the width of the "front edge" of the detected object. The position and the extent of the width of the detected object in the horizontal plane relative to the vehicle rear end are represented on a display screen.

Since a real pictorial representation of the rear danger zone is dispensed with, imaging optical systems can be greatly simplified, and therefore produced cost-effectively. Errors can be calibrated out in a simple way.

The reversing aid can also be used, in a modified fashion, to look ahead, for example in order to display for trucks the adequate clearance of tunnels or passages.

In accordance with a further basic idea of the invention, the measuring beam horizontal guidance system cooperates with a measuring beam vertical guidance system. A predetermined solid angle range can be periodically scanned in the horizontal and vertical directions in the manner of a scanning or rasterizing operation owing to the fan-shaped design, resulting therefrom, of a band of light together with the horizontal movement thereof. For this purpose, the evaluation device comprises a height-determining device for the purpose of determining the extent of the height of the detected object, which can be represented pictorially with the aid of representational means of the display screen.

The driver can use the representation of the rear zone with relative positions and widths of the detected objects in conjunction with data on their height and on the basis of his own intelligence to undertake a realistic assessment of the zone behind the vehicle. When reversing, he can follow the movement of his own vehicle and/or its rear end with the aid of the pictorial representation.

In order to be able to make a sufficiently accurate statement on the height of the detected objects, and to minimize the technical outlay, the solid angle range scanned by the measuring beam vertical guidance system can be subdivided into a plurality of height angle ranges. In this case, each detected object point situated in a specific height angle range is assigned a height range value. In order to distinguish between objects of different height, and to undertake assignment relative to specific object heights, the representational means of the display screen can have for each of the height range values a different coloured, hatched and/or similar distinguishable representational form.

The distance of the detected object can be calculated by evaluating the geometrical desired values. However, in the case of such a calculation no account is taken of any distortions or similar disturbances. It is therefore provided according to the invention to determine the distance and/or the position and the extent of the width of the detected object with the aid of look-up tables with predetermined desired values from the prescribed optical and geometrical factors of the receiver. The disturbing factors can be taken into account in the look-up tables. No use is made of appreciable computer power, nor is there, therefore, any need for software. In the case of very large piece numbers, it is expedient to integrate the entire electronic evaluation system into one to two chips.

In order to be as secure as possible against unwanted light, the transmitter can have at least one narrow-band or monochromatic light source. Likewise, the receiving cameras are to be of narrow-band design and to be sensitive only in the wavelength region used by the transmitter.

The measuring beam horizontal guidance system and/or the measuring beam vertical guidance system can have a mirror wheel and/or LCD stops and/or similar aids for measuring-beam scanning. The measuring-light beam can easily be caused to sweep over the desired solid angle range with the aid of these measures. The use of different imaging sensors, for example for ultrasound or radar, is conceivable.

The receiver can have at least one imaging optical system with a plurality of light-sensitive semiconductor sensors arranged in the image plane thereof. The semiconductor sensors are inexpensive and sensitive to the wavelength used.

It is possible to arrange in the image plane of the receiver a number of sensor rows which corresponds at least to the number of height angle ranges into which the scanned solid angle range is split up. By suitably limiting the number of rows, it is possible to realize a receiver of small design in conjunction with satisfactory height resolution.

The optical transmitter and camera(s) can be produced and calibrated as a finally assembled unit.

Further advantages, features and details of the invention will become clear with the aid of the following description in conjunction with the attached drawings, in which:

DETAILED DESCRIPTION OF THE PREFERRED EMBODIMENT

In the embodiment described, the driver is shown a bird's eye view (FIG. 1) of the zone behind the reversing motor vehicle on a monitor 22. The representation on the monitor 22, as it is known, for example, from the PC world, shows objects 32a, 32b, 32c, 32d diagrammatically, and refers with the aid of colour to their extent in three spatial dimensions. For this purpose, object points whose reflected light is perceived by sensors are located in a three-dimensional space coordinate system and represented on the monitor 22. The combination of the pixels on the monitor 22 to form images of extended structures is left to the "intelligence" of the driver. A schematic interpretation of the object space is used; such an interpretation applies, for example, to known split-beam methods in robotics, where powers required there are achieved only by means of a considerable outlay on computer power. Consequently, the reversing aid according to the invention requires no expensive information processing, and can be realized in a robust and cost-effective fashion.

Figure 1:
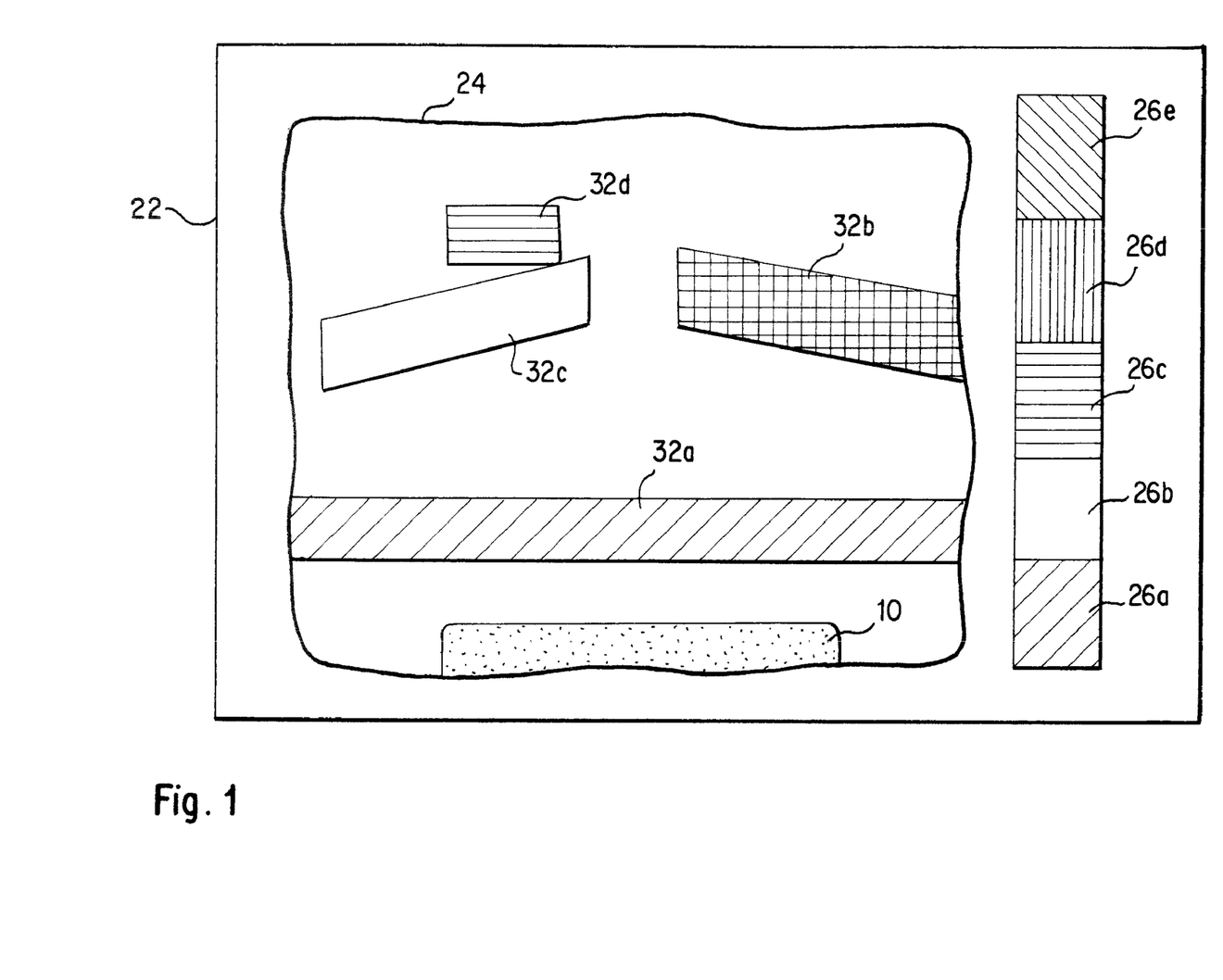
FIG. 1 shows a diagrammatic display screen representation in accordance with the invention, viewed from above onto the danger zone behind the actual, reversing vehicle.

FIG. 1 shows a diagram of the view of the monitor onto the rear zone, as it is shown to the driver when he would like to see into the dead area behind the vehicle rear end 10, for example when reversing. The indicated, detected objects 32a, 32b, 32c, 32d are represented with a different colour depending on their height. The height scale which assigns a specific colour 26a, 26b, 26c, 26d, 26e to each height range, is faded in on the right next to the representation of the rear danger zone. For example, a cordoning-off chain 32c is represented in yellow, a building edge 32b is represented in blue and green, a waste-paper bin 32d in green, and a kerbstone 32a in red. The rear end 10 of the actual motor vehicle is permanently faded in. The objects 32a, 32b, 32c, 32d, which have been determined in terms of their position relative to the vehicle rear end, and in terms of the extent of their width, are represented in a standardised depth. The monitor 22 can be integrated in the dashboard or in the central console.

Figure 2:
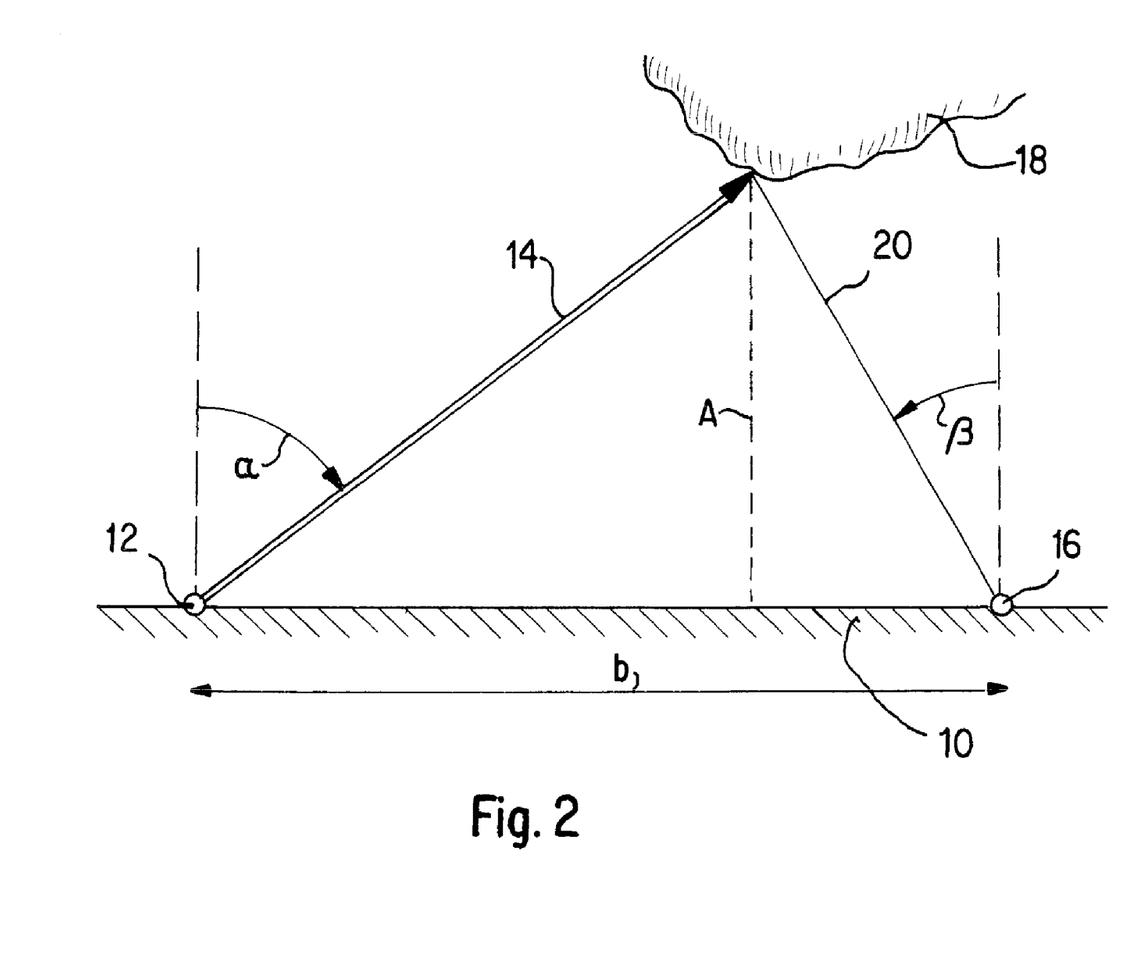
FIG. 2 shows a representation of the functional principle of the split-beam method.

The mode of operation of the reversing aid is based on triangulation using the split-beam method. FIG. 2 shows a diagram of the mathematical principle of the split-beam method applied. A transmitter 12 arranged at the rear-end region 10 (only indicated in FIG. 2) of the vehicle sends a light beam 14 into the scene to be surveyed. The direction of emission of the light beam is determined by the angle of emission $\alpha$. In the example represented in FIG. 2, $\alpha>0$ and $\beta<0$. The angle of emission oa varies with time. The light beam passes or sweeps periodically in the horizontal plane over a fixed angle range. Measured from the vehicle axis, this range reaches from approximately $-75°$ to $+75°$. The traversal time should be shorter than 200 ms.

A receiver 16, likewise arranged at the rear end region 10 of the vehicle, essentially comprises a camera (not represented in more detail) with light-sensitive semiconductor sensors in its focal plane. The camera is equipped with a wide angle lens and can be produced inexpensively, since the requirements placed on the imaging quality are reduced. Chromatic aberrations and distortions play no role. The focal length of the camera lens is only a few millimeters, for example 12 mm, and so focusing is not required. Since operation is done only with intrinsic light, the requirements placed on brightness control are very strongly reduced, and are served by the dynamics of silicon sensors, which are known to be very high.

The angle of reception $\beta$ is calculated from the position of a pixel in the image plane of the camera, together with the geometrical data thereof. With a given distance b between the transmitter 12 and the receiver 16, the angle of emission $\alpha$ and the angle of reception $\beta$, the rules of plane trigonometry can be used to calculate the plane coordinates x and y and the position of the detected object point in the horizontal plane.

In practice, this calculation is not carried out, but use is made of look-up tables (28a, 28b in FIG. 6), which can also take account of system-induced geometrical distortions.

Figure 3:
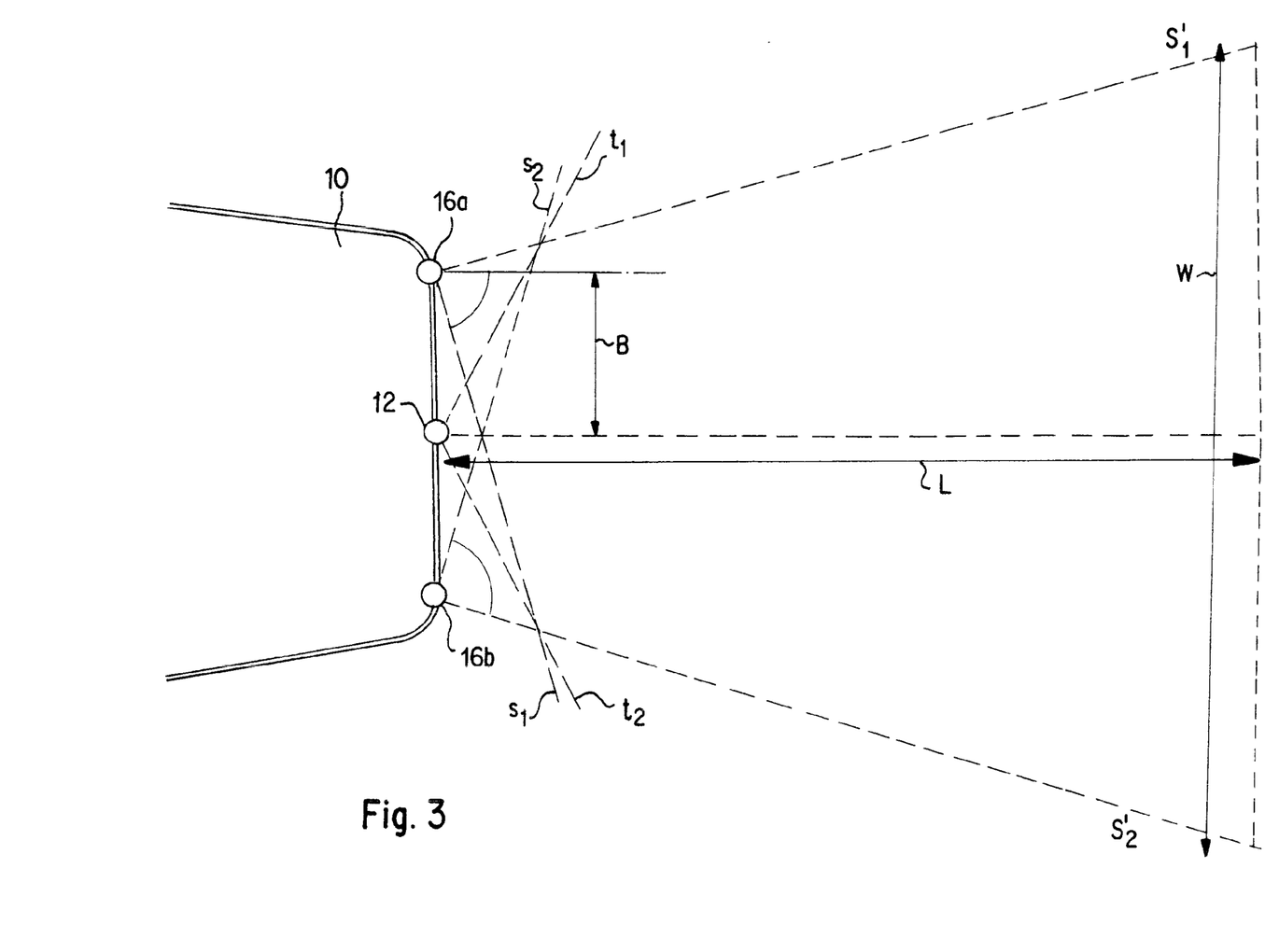
FIG. 3 shows a diagrammatic top view of the arrangement and the functional principle of the reversing aid according to the invention.

FIG. 3 shows the geometry of an exemplary embodiment. The transmitter 12 is arranged on the vehicle rear end 10, represented only by indication, approximately at the middle thereof. On both sides of the transmitter 12, the receivers 16a and 16b are positioned at a basic distance B=1 m from the transmitter 12 such that a satisfactorily wide danger zone is swept. The size of the danger zone to be monitored is selected as 3 m by 3 m according to DIN 75031. The transmit angle range $t_1$—transmitter 12—$t_2$ is 125°. The receive angle range $S_1$'—receiver 16a—$S_1$ ($S_2$'—receiver 16b—$S_2$) of the two receiving cameras 16a, 16b is 90 degrees, which corresponds approximately to a standard ultrawide-angle lens of a miniature camera with a focal length of 21 mm.

In the embodiment represented in FIG. 3, the detectable spatial point situated closest to the vehicle is approximately 25 cm away from the rear end 10.

For the conceivable case in which it suffices for the closest detectable spatial point to be approximately 50 cm away from the vehicle rear end, a monocamera arrangement with only one receiving camera would suffice. This arrangement (shown in simplified form in FIG. 2) would have an advantage in the case of adjustment. The one transmitter 12 and the one receiving camera 16 could be mounted on a rigid rail with a length of less than b=1 m. The mounting could be performed in the factory and adjusted there. Installation and replacement, for example in the case of body damage, could be performed by exchanging the entire unit.

Figure 4:
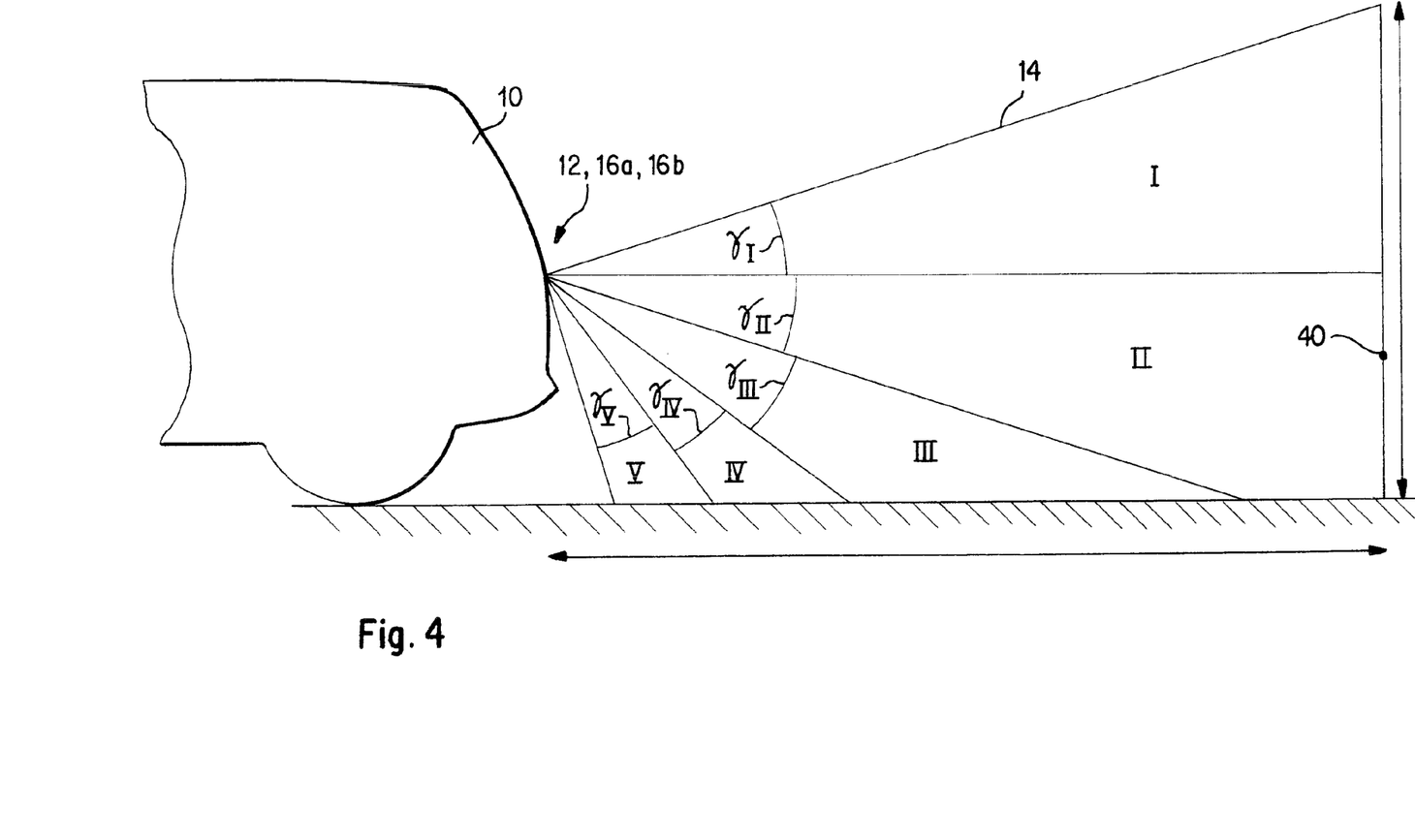
FIG. 4 shows a diagrammatic side view of the arrangement and the functional principle of the reversing aid according to the invention.

In the vertical direction, a coarse splitting up of the object space into, for example, only five regions I, II, III, IV, V, as shown in FIG. 4, suffices for providing the driver with information, a finer, or else a coarser setup being conceivable. A detected object point 40 is therefore assigned one of five height angle ranges (II in FIG. 4). The individual height angle ranges I, II, III, IV, V need not necessarily have the same aperture angles $\gamma_I, \gamma_{II}, \gamma_{III}, \gamma_{IV}, \gamma_V$. The area above the space reached by the measuring beam can easily be seen into by the driver. Each height angle range I, II, III, IV, V is represented on the monitor 22 with a dedicated colour, 26a, 26b, 26c, 26d, 26e. A monochrome monitor can, however, also represent the different height angle ranges by means of different hatching or similar distinguishing features. The driver can influence the form of the representation by means of suitable switches (not shown) on the monitor 22; for example, he can mask out specific height angle ranges, or represent them in a fused fashion.

FIG. 4 shows the monitored space in side view. A transmitter 12, which also emits in the vertical direction, is positioned at the vehicle rear end. The monitored space is split up vertically into five zones. The entire space is illuminated by only one transmitter 12, but observed by two cameras 16a, 16b, in order to be able to see into the entire space of interest with the aid of standard lenses.

The transmitter 12 has a light source which is as narrow-band as possible or monochromatic, for example an infrared solid-state laser.

Narrow-bandedness is desired both for the transmitter 12 and for the receiver 16, in order to be as well protected as possible against unwanted light. It is preferred to use infrared radiation with a wavelength of between 700 and 950 nm, since this is both invisible, and therefore not disturbing, and also safe to the eye.

Placed in the focal plane of the two receiving cameras 16a and 16b of the stereocamera arrangement, or of the one receiving camera 16 (FIG. 1) of the monocamera arrangement, are silicon detectors 30 (FIG. 6) which are inexpensive, and whose spectral sensitivity reaches into the wavelength region of 700 to 950 nm. No further information is given here on details of the transmitter 12, because scanning laser light sources are known in principle and are applied, for example, at sales points in modern department stores. The movement of the light beam is implemented in this case by a mirror wheel or by other aids, for example LCD stops.

The required number of sensor points in the image plane of the two cameras 16a, 16b of the stereocamera arrangement, or of the one camera 16 of the monocamera arrangement, is derived from the desired resolution. If there is a need for resolution of 2 line pairs per cm at the object at a distance of L=3 m (in FIG. 3), and for a field of view of width W=3 m, the requirement is therefore for 300*2*2= 1200 sensors per row. In this case, it must be established empirically whether half the resolution would suffice. Silicon sensors with a width of 10 μm are generally available. The focal length is calculated as 12 mm from the proportion 3 m:2.5 mm=focal length:10 μm. The camera is therefore of a very small design.

In the case of a vertical split up in five zones, there is a need in the image plane for only approximately 5 rows, because, as shown in FIG. 4, no object resolution occurs within a vertical zone. The number of zones with which it is possible to achieve the most favorable compromise between spatial resolution, depth resolution and technical outlay can be clarified in a feasibility study.

If only one sensor row is provided for each zone, the sensors used are extremely long by comparison with their width. In the case of 5 zones, a length of approximately 2 mm results for the sensors. The ratio of sensor length to sensor width of 200 to 1 could be very unfavourable for signalling reasons (dark current, etc.), with the result that increasing the line number per zone promises improvements here. For the sake of simplicity, it is therefore assumed for a further calculation that each vertical object space zone can be detected by $N_z>>1$ sensors, $N_z$ being the number of the sensor rows.

Figure 5:
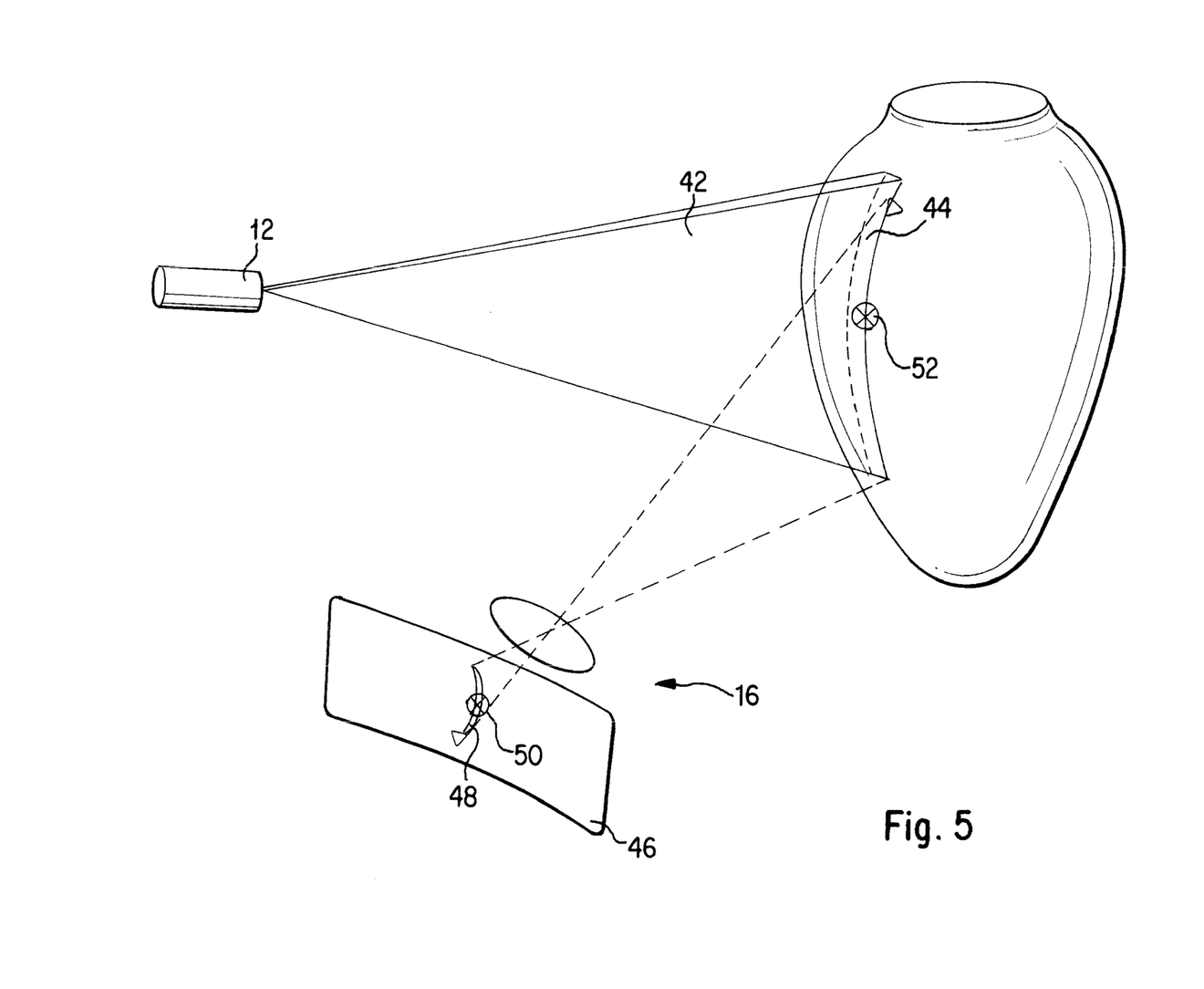
FIG. 5 shows a representation of the functional principle of the scanning operation.

The sketch in FIG. 5 shows the interplay of a transmitter 12 and a receiver 16. The transmitter 12 generates a narrow, high band of light 42 which sweeps over the object space in a horizontal movement. The section 44, which is generated by the band of light 42 with the object surface represented, is imaged by the camera 16 in its image plane 46 as curve 48. The pixel 50 situated furthest to the right on the image plane in FIG. 5 at every instant and at every angle α of the transmitter belongs to the object point 52 which is situated nearest to the transmitter. In order to determine the nearest object point for each angle α of the transmitter in each vertical zone, the image plane 48 must be scanned after the first pixel 50 coming from the right. This means that the scanning operation through the sensor plane is performed considerably more quickly than the scanning movement of the light source. Since this scanning movement proceeds with satisfactory speed at approximately 5 Hz, the image plane should be scanned at not less than, possibly, 5 kHz.

Figure 6:
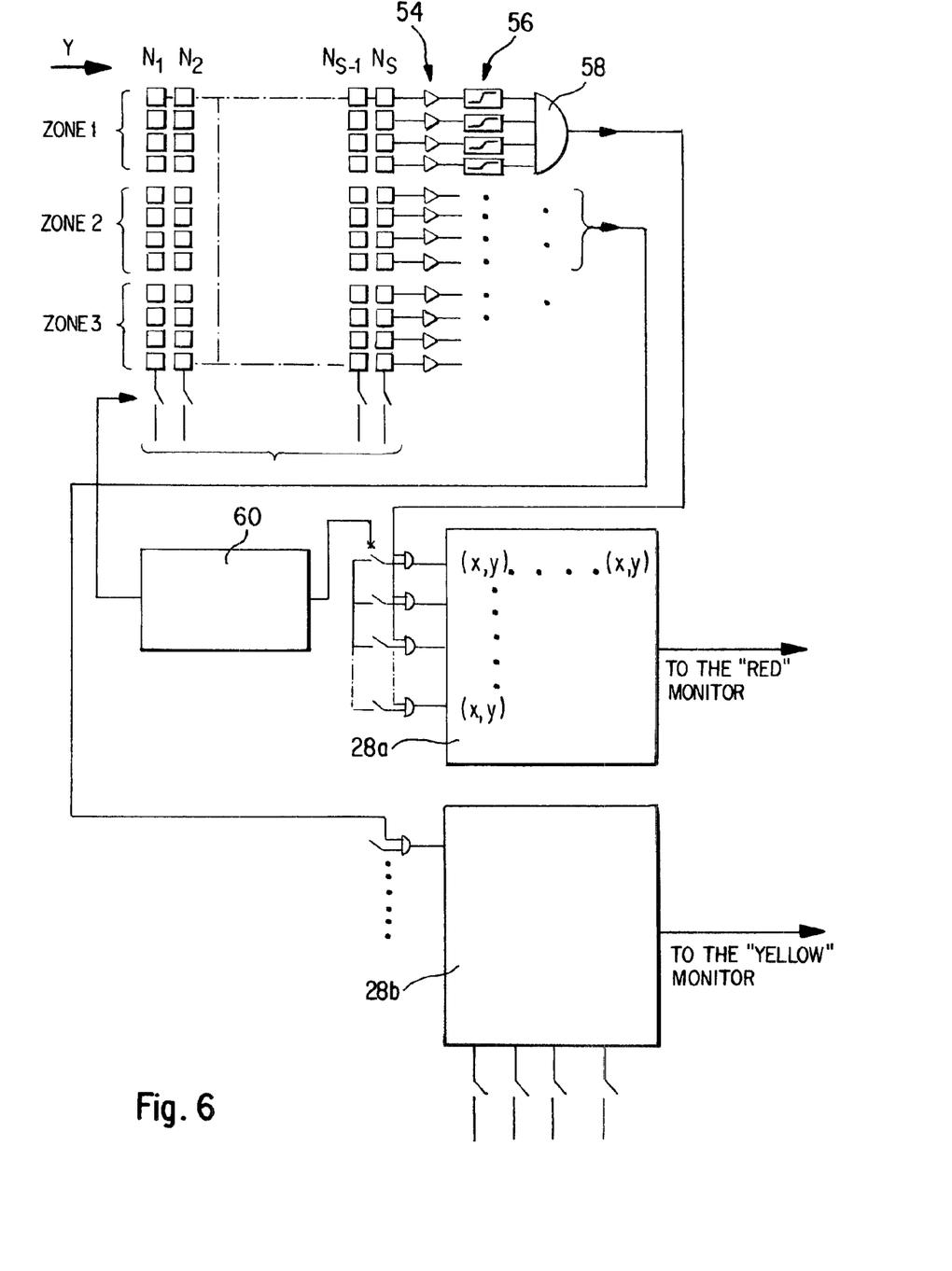
FIG. 6 shows a greatly simplified, diagrammatic block diagram of the circuit arrangement for the reversing aid according to the invention.

FIG. 6 shows a representation (only indicated) of a simple technical possibility for a circuit arrangement with the aid of which the scanning operation can be implemented in an uncomplicated way. It is outlined in the upper part of FIG. 6 how in each case $N_z$ sensor rows 30 are combined by an OR gate 58 after amplification 54 and discrimination 56 of threshold values. All the columns $N_1-N_s$ are interrogated in sequence coming from the left (arrow Y) when seen from the lens side of the image plane. As soon as a pixel is detected, the look-up table 28a, 28b belonging to the zone (zone 1–zone 3) is selected. A specific column is activated there by the optotransmitter, and the row is activated by a column incrementer 60 of the sensor plane. Each column of the look-up table 28a or 28b is therefore traversed once sequentially during an optotransmitter scan. In other words, each element (x, y) of the look-up table is activated once during an optotransmitter scan. The value of the element (x, y) of the look-up table, which is activated at the instant when a light point is detected, is sent to the monitor (not shown). This value (x, y) includes the display screen coordinates of a pixel, which bears the colour assigned to its zone, or some other vertical identifier. After a light point has been detected, a gate circuit (not shown) blocks the remainder of a sensor plane scan, in order to ensure that the nearest object point is always detected.

The look-up tables 28a, 28b are formed from PROMs (programmable read-only memories). They are "burnt" after calibration of the transmitter and receiver, which are permanently interconnected on a rail, and are therefore no longer changed. They include the display screen coordinate pair valid for each sensor plane column (corresponding to the look-up table row) and each direction of transmission (corresponding to the look-up table column). As explained at the beginning, these coordinates are calculated using the rules of plane trigonometry, in a fashion corrected for distortions which stem partly from the wide angle optics of the camera(s), and in part have different causes, which are to be determined empirically.

The invention specifies a reversing aid which supplies the driver, in particular during reversing, with reliable information on the respective spatial arrangement of objects located in the rear danger zone relative to the vehicle. Moreover, the reversing aid according to the invention renders the detection of objects and the processing of information particularly simple, robust, reliable and cost-effective.

The invention being thus described, it will be obvious that the same may be varied in many ways. Such variations are not to be regarded as a departure from the spirit or scope of the invention, and all such modifications as would be obvious to one skilled in the art are intended to be included within the scope of the following claims.

What is claimed is:

1. A reversing aid for assisting the driver of a motor vehicle, particularly when parking, comprising at least one transmitter, arranged at the rear end region of the motor vehicle, for emitting measuring beams into the rear danger zone, at least one receiver, arranged at the rear end region of the motor vehicle, for receiving beams reflected at at least one detected object, a measuring beam horizontal guidance system for the purpose of periodically scanning a predetermined angle range in the horizontal plane, an evaluation device for determining the position of the detected object in the horizontal plane relative to the vehicle rear end and the extent of the width of the detected object, and a display screen for pictorially representing the position and the extent of the width of the detected object in the horizontal plane relative to the vehicle rear end.

2. A reversing aid according to claim 1, wherein the measuring beam horizontal guidance system cooperates with a measuring beam vertical guidance system in order periodically to scan a predetermined solid angle range in the horizontal and vertical directions in the manner of a scanning or rasterizing operation, the evaluation device comprises a height-determining device for the purpose of determining the extent of the height of the detected object, and the display screen has representational means for pictorially representing the extent of the height of the detected object.

3. A reversing aid according to claim 2, wherein the solid angle range scanned by the measuring beam vertical guidance system is subdivided into a plurality of height angle ranges, each detected object point situated in a specific height angle range is assigned a height range value, and the representational means of the display screen has for each of the height range values a different coloured, hatched and/or similar, distinguishable representational form.

4. A reversing aid according to claim 1, wherein a look-up table device with predetermined desired values for determining the distance and/or the position and the extent of the width of the detected object from the prescribed optical and geometrical factors of the receiver.

5. A reversing aid according to claim 1, wherein the transmitter has at least one narrow-band or monochromatic light source, and the measuring beam horizontal guidance system and/or the measuring beam vertical guidance system have a mirror wheel and/or LCD stops and/or similar aids for measuring-beam scanning.

6. A reversing aid according to claim 1, wherein the receiver has at least one imaging optical system with a plurality of light-sensitive semiconductor sensors arranged in the image plane thereof.

7. A reversing aid according to claim 3, wherein the image plane of the receiver are a number of sensor rows which corresponds at least to the number of height angle ranges into which the scanned solid angle range is split up.

8. A method for detecting and displaying an object in a rear region of a motor vehicle:

scanning periodically in a predetermined angle range in the horizontal plane using measuring beams emitted into the rear region of the motor vehicle;

receiving the measuring beams reflected from the object;

determining the position of the object in the horizontal plane relative to the vehicle rear end and the extent of the width of the object; and displaying the position and the extent of the width of the detected object in the horizontal plane relative to the vehicle rear end.

9. The method according to claim 8 further including scanning in a predetermined solid angle range in the horizontal and vertical directions in the manner of a scanning or rasterizing operation, determining the extent of the height of the detected object, and displaying the extent of the height of the detected object.

10. The method according to claim 9 further including dividing the solid angle range into a plurality of height angle ranges, assigning a height range value to each detected object point situated in a specific height angle range, and displaying each of the height range values in a different colored, hatched or similar, distinguishable representational form.

* * * * *